May 9, 1939.   C. J. McKINNEY   2,158,033
METHOD OF MAKING CELLULAR MATERIAL
Original Filed March 4, 1936
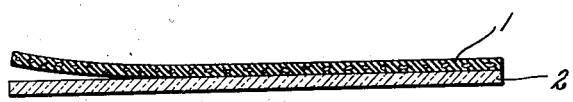
FIG.—1
FIG.—2
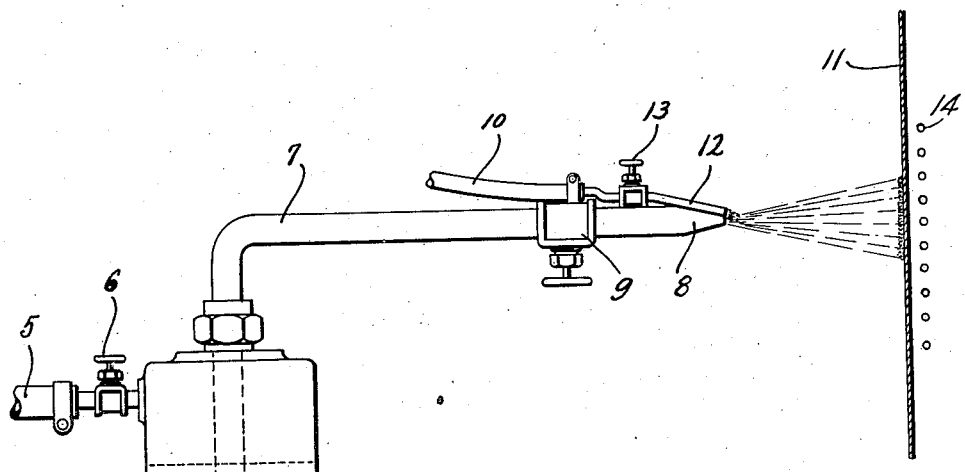
FIG.—3
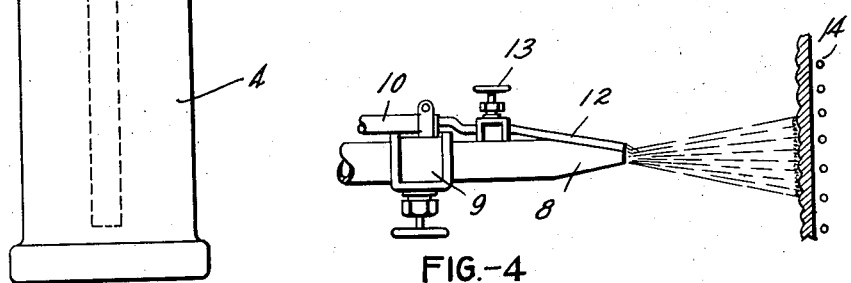
FIG.—4
INVENTOR
CARLOS J. McKINNEY
BY
Brockett, Hyde, Higley & Meyer
ATTORNEYS Patented May 9, 1939

2,158,033

UNITED STATES PATENT OFFICE 2,158,033

METHOD OF MAKING CELLULAR MATERIAL

Carlos J. McKinney, Detroit, Mich., assignor of one-half to James S. Reid, Shaker Heights, Ohio.

Original application March 4, 1936, Serial No. 67,051. Divided and this application February 10, 1937, Serial No. 125,019

13 Claims. (Cl. 18—58)

This invention relates to cellular material and to the method of making the same, the present application being a division of my prior application for Cellular material and method of making the same, filed March 4, 1936, Serial No. 67,051.

The general object of the present invention is the provision of improved cellular material, having sound-insulating and other useful properties, and an improved method of making such material.

A more specific object of the present invention is the provision of improved cellular material in separate sheet form and improved cellular material in the form of layers or coatings adhesively secured to metal or other surfaces, thereby providing improved composite or laminated products.

Another more specific object of the present invention is the provision of an improved method for making such cellular material in either separate sheet form or in the form of layers or coatings adhesively secured to metal or other surfaces.

Another more specific object of the present invention is the provision of an improved method for making such cellular material, such method consisting in spraying onto the surface of an object certain materials which form on such surface the present improved cellular material. If such surface is a smooth one, the cellular material formed thereon may be readily removed in the form of separate flat sheets, as will later appear.

Further objects of the present invention, and further features thereof, will be apparent from the following description of such invention, reference being had to the accompanying drawing in which:

Fig. 1 is a cross-sectional view of a sheet of the present improved cellular material and a sheet of glass on which it was formed for removal therefrom, a portion of such cellular sheet being separated from such glass sheet; Fig. 2 is a cross-sectional view of a composite or laminated product, comprising a sheet metal member and a layer or coating of the present improved cellular material formed thereon for permanent securement thereto; Fig. 3 is a side view of a spraying device by means of which the present improved cellular material may be formed, either as a removable sheet or as a permanent coating or layer for the surface of an object, and Fig. 4 is a detail view showing a portion of the spraying device and an enlarged portion of the surface to which the composition is applied, the surface being shown etched.

In Fig. 1 of the accompanying drawing, the numeral 1 indicates a sheet of the present improved cellular material as formed on a smooth surface, such as the upper surface of a sheet of glass 2. Because of the smooth surface on which such cellular material is formed, said material may be readily removed from such surface in sheet form, a portion of such cellular material being shown in raised position with respect to said glass sheet.

In Fig. 2 of the accompanying drawing, in which a composite or laminated product is shown, numeral 2a indicates a relatively thin member, such as a sheet metal member, on the upper surface of which the present improved cellular material is formed as a layer or coating 1a, said cellular layer or coating being permanently secured, adhesively, to said surface.

In accordance with the present invention, the present improved cellular material is formed, either as a removable sheet, such as in Fig. 1, or as a permanent layer or coating for the surface of an object, such as in Fig. 2, by spraying onto the surface of an object, a smooth surface if the cellular material is to be removed therefrom, a composition containing rubber latex or other suitable material in the presence of a compound which decomposes under heat or which reacts with another compound to form a gas, the intermingling of such gas with such composition during the setting or coagulating thereof resulting in the formation on such surface of the present improved cellular material.

As illustrated in Fig. 3 of the accompanying drawing, the composition containing rubber latex or other suitable material may be confined within a suitable tank 4 having a compressed air inlet pipe 5 controlled by a valve 6 and with a discharge pipe 7 for such composition, such discharge pipe having a suitable nozzle 8 through which such composition may be sprayed onto the surface 11 upon which the present improved cellular material is to be formed. As shown, the discharge pipe 7 extends down into the composition within the tank 4, terminating adjacent the bottom of such tank, the pressure of the compressed air within said tank, acting downwardly upon the upper surface of such composition, being effective, whenever the valve 9 of such discharge pipe is opened, to force such composition through the discharge pipe and outwardly from the nozzle 8 thereof.

In the embodiment of the invention here shown, a cooperating discharge conduit 10 is supported on the discharge pipe 7, said conduit having a nozzle 12 adjacent the nozzle 8 of said discharge pipe and also having a suitable valve 13 for controlling the flow of material therethrough, the material discharged by said conduit being utilized in the production of the aforesaid gas, all as will later appear.

For purposes of illustration, the present invention will be described in connection with a rubber latex composition, although it is to be understood that the invention is not limited to that particular composition.

In forming the rubber latex composition, the rubber latex may be, and preferably is, mixed with a suitable filler, such as wood flour, talc, ground cork, china clay, or the like, in amounts ranging up to approximately 25% or more of the composition. The amount of filler used, however, should not increase the viscosity of the composition to such an extent as to prevent spraying of such composition. If necessary or desirable, an alkali may be added to the composition, in sufficient quantities to prevent setting or coagulation of the rubber latex before the composition is sprayed onto a surface for the formation of cellular material. Preferably, an alkali in an amount ranging up to 10% of the composition is added, said alkali, upon reaction with an acid, forming a gas. Any suitable alkali may be utilized, which is capable of reacting with an acid to form a gas, such as sodium carbonate or sodium bicarbonate, although any one of the alkali metal carbonates or bicarbonates may be employed. If desired, the alkali content of the composition may be composed partially of other alkalies, such as ammonia or an alkali metal hydroxide.

For reaction with the alkali content of the rubber latex composition to produce the desired gas, the discharge conduit 10 is connected with a suitable source of a weak acid, such as formic or acetic acid, such acid reacting with the alkali metal carbonate or bicarbonate of the rubber latex composition, when such acid and such composition are simultaneously sprayed onto the surface 11 upon which the cellular material is to be formed, to evolve carbon dioxide gas. The acid also neutralizes the alkali, thereby causing a rapid setting or coagulation of the rubber latex which forms a binder for the filler of the composition, the evolved carbon dioxide being occluded in the mass. A cellular material is thus easily, quickly and cheaply produced, said material having sound-insulating and other useful properties.

When it is desired to form the cellular material in the form of separate sheets, the rubber latex composition and the cooperating acid are simultaneously sprayed onto a smooth or polished surface, such as the glass surface of Fig. 1. After the rubber latex has set or coagulated, the cellular sheet material thus formed may be readily stripped from such smooth or polished surface, and used in such sheet form for sound-insulating or other purposes.

If it is desired to permanently provide the surface of an object with a layer or coating of cellular material, to thus provide a composite or laminated product, for sound-insulating or other purposes, a material which will assist in causing the cellular material to adhere to such surface may be added to the rubber latex composition. For example, rosin in amounts ranging up to approximately 5% of the rubber latex composition may be added for such purpose. The addition of rosin or other such material is not essential, however, because if the surface on which the cellular material is formed is not a smooth or polished surface, such cellular material will adhere to it.

If desired, the surface to be permanently coated with a layer of cellular material may be suitably roughened, as indicated by the numeral 15 in Fig. 4 of the drawing, such as by the use of a wire brush, or by mechanical abrasion, or if the surface is a metal one, by etching, sand blasting, or the like. When the surface upon which the cellular material is to be formed and to which it is to adhere is a metal surface, and an acid is utilized to decompose the alkali metal carbonate of the rubber latex solution, the acid has a tendency to etch said metal surface, thereby insuring adherence of the cellular material thereto. If desired, a suitable primer coating may be applied to the surface on which the cellular material is to be formed and to which it is to adhere. Such primer coatings are well known in the art and may be formed by applying to such surface a composition consisting of a suitable pigment, such as red oxide of lead, a vegetable drying oil, such as linseed oil, a thinner, such as turpentine or petroleum spirits, and a drier, such as manganese or lead resinate or linolenate.

If the metal or other surface, on which the cellular material is to be formed and to which it is to adhere is heated, say to a temperature ranging up to approximately 300° F. if it is of metal, during the spraying thereon of the rubber latex composition and the cooperating acid, the cellular material not only will set or coagulate more quickly but also, it will adhere more tenaciously to such surface. The metal may be heated by any suitable means, such as coils 14.

If desired, suitable pigments, such as lithopone, zinc oxide, bronze blue or ochre may be added to the rubber latex composition to produce the desired coloration of the cellular material. Other ingredients may also be added to such rubber latex composition, such as accelerators and the like, if desired.

Instead of utilizing in the rubber latex composition an alkali metal carbonate or bicarbonate as the compound which decomposes to form a gas, other compounds or materials, which decompose under heat or form a gas in the presence of an acid, may be utilized. For example, when the cellular material is to be formed on a heated metal surface, ammonium nitrite may be used, such material, upon heating yielding nitrogen gas. In such instances, acid is also simultaneously sprayed onto said metal surface with the rubber latex composition to cause a rapid setting or coagulation of the cellular material, the nitrogen evolved forming bubbles which become occluded in the mass.

Instead of using rubber latex, a bituminous material, such as asphalt or a synthetic resin, such as a phenolic condensation product, or a resin formed by the reaction of a polyhydric alcohol and a polybasic acid, such as the glycerol phthalate resins, may be used. In such cases, a suitable material, such as an alkali metal carbonate or bicarbonate, is added to a solution of the resin in a volatile solvent, such as benzene or a mixture of benzene and alcohol, or to a solution of the asphalt in petroleum spirits or carbon disulphide. The solution of the asphalt or resin, and a suitable acid, are simultaneously sprayed upon the surface upon which the cellular material is to be formed, said surface being in a heated condition. The heat volatilizes the solvent and the resin polymerizes and sets during the evolution of the gas, thereby causing the formation of cellular material containing gas occlusions.

From the foregoing, it will be apparent that I have provided an improved cellular material which is comparatively light in weight and which has sound-insulating and other useful properties.

It will also be seen that I have provided an improved method for forming such cellular material, either in separate sheet form or as the permanent coating or layer of a composite product.

To those skilled in the art to which this invention relates, many modifications of and widely different embodiments and applications of such invention will suggest themselves, all within the scope and spirit of this invention, it being understood that the present description is merely illustrative.

What I claim is:

1. The process of preparing cellular material which comprises spraying against a smooth surface a composition containing latex and an alkali metal carbonate and simultaneously spraying a weak acid onto the same surface in such a manner that the sprayed particles commingle and carbon dioxide is evolved, thereby causing a rapid setting of said latex in cellular form, and then separating the cellular strip from such surface.

2. The process of preparing a laminated product which comprises spraying against a heated surface a composition containing latex and a compound which decomposes at elevated temperatures to form a gas, said surface being at such a temperature during the spraying operation that said compound will decompose to form said gas.

3. The process of preparing a laminated product which comprises spraying against a heated surface a composition containing latex and a coagulating-preventive compound which is capable of reacting with an acid to form a gas and simultaneously spraying an acid upon said surface in such a manner that the sprays commingle, said acid being capable of reacting with said coagulating-preventive compound to form said gas during the setting of the latex.

4. The process of preparing a laminated product which comprises spraying against a metal surface a composition containing latex, a coagulating-preventive compound which is capable of reacting with an acid to form a gas and an adhesive, and simultaneously spraying upon said surface an acid which reacts with said coagulating-preventive compound to form said gas, thereby causing the rapid setting of said composition in cellular form.

5. The process of preparing cellular material which comprises spraying against a surface a composition containing a material having binding and sound insulating properties and which sets in the presence of air and a compound which is capable upon reaction with a second compound to form a gas, and simultaneously spraying the second compound against said surface to form said gas during the setting of said material.

6. The process of preparing cellular material which comprises spraying against a surface a composition containing latex and a compound which prevents the coagulation of the latex and which is capable of reacting with a second compound to form a gas and cause setting of said material, and simultaneously spraying the second compound against said surface to cause the setting of the latex in cellular form.

7. The process of preparing cellular material which comprises spraying against a smooth surface a composition containing latex and a compound which prevents the coagulation of the latex and which is capable of reacting with a second compound to form a gas and cause setting of the material, and simultaneously spraying the second compound against said surface to form said gas and cause setting of the latex, and then removing the cellular material thus formed from the smooth surface.

8. The process of preparing a laminated product which comprises spraying against a roughened surface a composition containing a material having binding and sound-insulating properties and which sets in the presence of air and a compound which is capable upon reaction with a second compound to form a gas and simultaneously spraying the second compound against said surface to form said gas during the setting of said material.

9. The process of preparing a laminated product which comprises spraying against a coated surface a composition containing latex and a coagulative preventive compound which is capable of reacting with a second compound to form a gas, and simultaneously spraying the second compound against said surface, said second compound being capable of neutralizing the coagulative preventive compound, thereby causing a rapid setting and adhesion of said latex in cellular form upon said coated surface.

10. The process of preparing a laminated product which comprises spraying against a heated roughened surface a composition containing a material having binding and sound-insulating properties and which sets in the presence of air and a compound which is capable upon reaction with a second compound to form a gas, and simultaneously spraying the second compound against said surface to form said gas during the setting of said material.

11. The process of preparing a laminated product which comprises spraying against a surface a composition containing a material having binding and sound-insulating properties and which sets in the presence of air and a compound which is capable of reacting with a second compound to form a gas and an adhesive, and simultaneously spraying the second compound against said surface to form said gas during the setting of said material.

12. The process of preparing a laminated product which comprises spraying against a surface a composition containing latex and a coagulative preventive substance capable of reacting with a compound to form a gas and cause setting of said material and an adhesive, and simultaneously spraying said compound against said surface to cause the setting of the latex in cellular form.

13. The process of preparing a laminated product which comprises spraying against a coated surface a composition containing a material having binding and sound-insulating properties and which sets in the presence of air and a compound which is capable of reacting with a second compound to form a gas, and simultaneously spraying the second compound against said surface to form said gas during the setting of the material.

CARLOS J. McKINNEY.